US011972003B2

(12) United States Patent
Walters et al.

(10) Patent No.: US 11,972,003 B2
(45) Date of Patent: Apr. 30, 2024

(54) SYSTEMS AND METHODS FOR PROCESSING REQUESTS FOR ACCESS

(71) Applicant: Capital One Services, LLC, McLean, VA (US)

(72) Inventors: Austin Walters, Savoy, IL (US); Jeremy Edward Goodsitt, Champaign, IL (US); Fardin Abdi Taghi Abad, Seattle, WA (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 456 days.

(21) Appl. No.: 17/110,358

(22) Filed: Dec. 3, 2020

(65) Prior Publication Data
US 2022/0179976 A1  Jun. 9, 2022

(51) Int. Cl.
G06F 21/00 (2013.01)
G06F 21/45 (2013.01)
G06F 21/60 (2013.01)
G06N 3/045 (2023.01)

(52) U.S. Cl.
CPC .......... G06F 21/604 (2013.01); G06F 21/45 (2013.01); G06N 3/045 (2023.01)

(58) Field of Classification Search
CPC ..... G06F 21/604; G06F 21/45; G06N 3/0454; G06N 3/044; G06N 20/00
See application file for complete search history.

(56) References Cited

U.S. PATENT DOCUMENTS

| 9,430,343 | B1 * | 8/2016 | Trachtman | G06F 11/2094 |
| 10,521,582 | B2 * | 12/2019 | Shukla | G06F 21/45 |
| 2016/0294840 | A1 * | 10/2016 | El Khoury | H04L 63/102 |
| 2018/0203994 | A1 * | 7/2018 | Shukla | G06F 21/45 |
| 2019/0026634 | A1 * | 1/2019 | Homeyer | G06N 20/00 |
| 2019/0258818 | A1 * | 8/2019 | Yu | G06F 21/44 |
| 2020/0026992 | A1 * | 1/2020 | Zhang | G06N 3/084 |
| 2022/0182225 | A1 * | 6/2022 | Valente | H04L 9/3213 |

FOREIGN PATENT DOCUMENTS

| EP | 1923810 A2 * | 5/2008 | G06F 21/604 |
| WO | WO-9849644 A1 * | 11/1998 | G06Q 10/00 |
| WO | WO-2020034733 A1 * | 2/2020 | G06F 16/535 |

\* cited by examiner

Primary Examiner — John B King
(74) Attorney, Agent, or Firm — TROUTMAN PEPPER HAMILTON SANDERS LLP; Christopher J. Forstner; John A. Morrissett

(57) ABSTRACT

The disclosed methods may receive a first request for access to a first system memory from a new user and a first justification, the first request includes first role information and first current access information of the new user, determine whether the first request is within a request cluster based on first role history information and current access history information. When the first request is within the request cluster, generate a matrix from the first role information and the first current access information, and determine using a first neural network, whether to grant the first request based on the matrix. When the first request is granted by the first neural network, determine, using a second neural network, whether the first justification is similar to first justification history information. When the first justification is similar to the first justification history information, grant the new user access to the first system memory.

18 Claims, 7 Drawing Sheets

SYSTEMS AND METHODS FOR PROCESSING REQUESTS FOR ACCESS

FIELD OF INVENTION

The present disclosure relates to a system and method for processing requests for access to a system (e.g., software), memory (e.g., data access), or both. In particular, the present disclosure may include using machine learning models, neural networks, or both to grant a new user access the system, memory, or both.

BACKGROUND

In many organizations, an employee's request for access to a particular software or data must go through a strict approval process before the user can gain access. The approval requirements typically include multiple manager level employees or higher reviewing the new employee's request and business case for access to a particular software in succession based arbitrarily or on information available to the manager level employee or higher. If all the manager level employees or higher have approved the new employee's request, the new employee is typically granted access. The problem is that some manager level employees or higher sit on the request for long periods of time (e.g., weeks or months) making effectively blocking the new employee from getting the access he or she likely needs. Additionally, some manager level employees or higher arbitrarily grant access or grant access too quickly without conducting any review surrounding the request.

Accordingly, there is a need for improved systems and methods to automate, expedite, and thoroughly review requests for access to systems (e.g., software), memory (e.g., data access), or both. Embodiments of the present disclosure are directed to this and other considerations.

SUMMARY

Disclosed embodiments provide systems and methods for processing requests for access to a system (e.g., software), memory (e.g., data access), or both.

A method may include retrieving, by one or more processors, first role history information, first current access history information, and first justification history information of users that have access to the first system memory and generating, by the one or more processors, one or more request clusters based on the first role history information and the first current access history information of the users that have access to the first system memory. The method may include receiving, by the one or more processors, a first request for access to the first system memory from a new user and a first justification for access for the first system memory, the first request comprises first role information of the new user and first current access information of the new user. The method may include determining, by the one or more processors, whether the first request is within a request cluster of the one or more request clusters. When the first request is within the request cluster of the one or more request clusters, the method may include transmitting, by the one or more processors, the first request and the first justification to a first user in a first stage of a first process. In response to receiving an indication of grant from the first user, the method may include generating, by the one or more processors, a matrix from the first role information of the new user and the first current access information of the new user of the first request and determining, using a first neural network, whether to grant the first request based on the matrix in a second stage of the first process. When the first request is granted by the first neural network, the method may include determining, using a second neural network and the one or more processors, whether the first justification is similar to the first justification history information of the users that have access to the first system memory in the second stage of the first process. When the first justification is similar to the first justification history information of the users that have access to the first system memory, the method may include determining whether the first process comprises one or more additional stages. When the first process does not comprise the one or more additional stages, the method may include transmitting, using the one or more processors, the first request and the first justification to a final user in a final stage of the first process.

A method may include receiving, by one or more processors in communication with a memory, a first request for access to the first system memory from a new user and a first justification for access for the first system memory, the first request includes first role information of the new user and first current access information of the new user, determining, by the one or more processors, whether the first request is within a request cluster of one or more request clusters based on first role history information and first current access history information. When the first request is within the request cluster of the one or more request clusters, the method may include transmitting, using the one or more processors, the first request and the first justification to a first user in a first stage of a first process. In response to receiving an indication of grant from the first user, the method may include generating, using the one or more processors, a matrix from the first role information of the new user and the first current access information of the new user of the first request, determining, using a first neural network and the one or more processors, whether to grant the first request based on the matrix in a second stage of the first process, when the first request is granted by the first neural network, the method may include determining, using a second neural network and the one or more processors, whether the first justification is similar to first justification history information of the users that have access to the first system memory in the second stage of the first process. When the first justification is similar to the first justification history information of the users that have access to the first system, the method may include determining, using the one or more processors, whether the first process includes one or more additional stages in the second stage of the first process. When the first process does not include the one or more additional stages, the method may include transmitting, using the one or more processors, the first request and the first justification to a final user in a final stage of the first process.

A method may include receiving, using one or more processors, a first request for access to a first system memory from a new user and a first justification for access for the first system memory, the first request includes first role information of the new user and first current access information of the new user. The method may include determining whether the first request is within a request cluster of one or more request clusters based on first role history information and current access history information of users that have access to the first system memory. When the first request is within the request cluster of the one or more request clusters, the method may include generating a matrix from the first role information of the new user and the first current access information of the new user of the first request and determining, using a first neural network and the one or more processors, whether to grant the first request based on the matrix. When the first request is granted by the first neural network, the method may include determining, using a second neural network and the one or more processors, whether the first justification is similar to first justification history information of the users that have access to the first system memory. When the first justification is similar to the first justification history information of the users that have access to the first system memory, the method may include granting the new user access to the first system memory.

Further features of the disclosed systems, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1A:
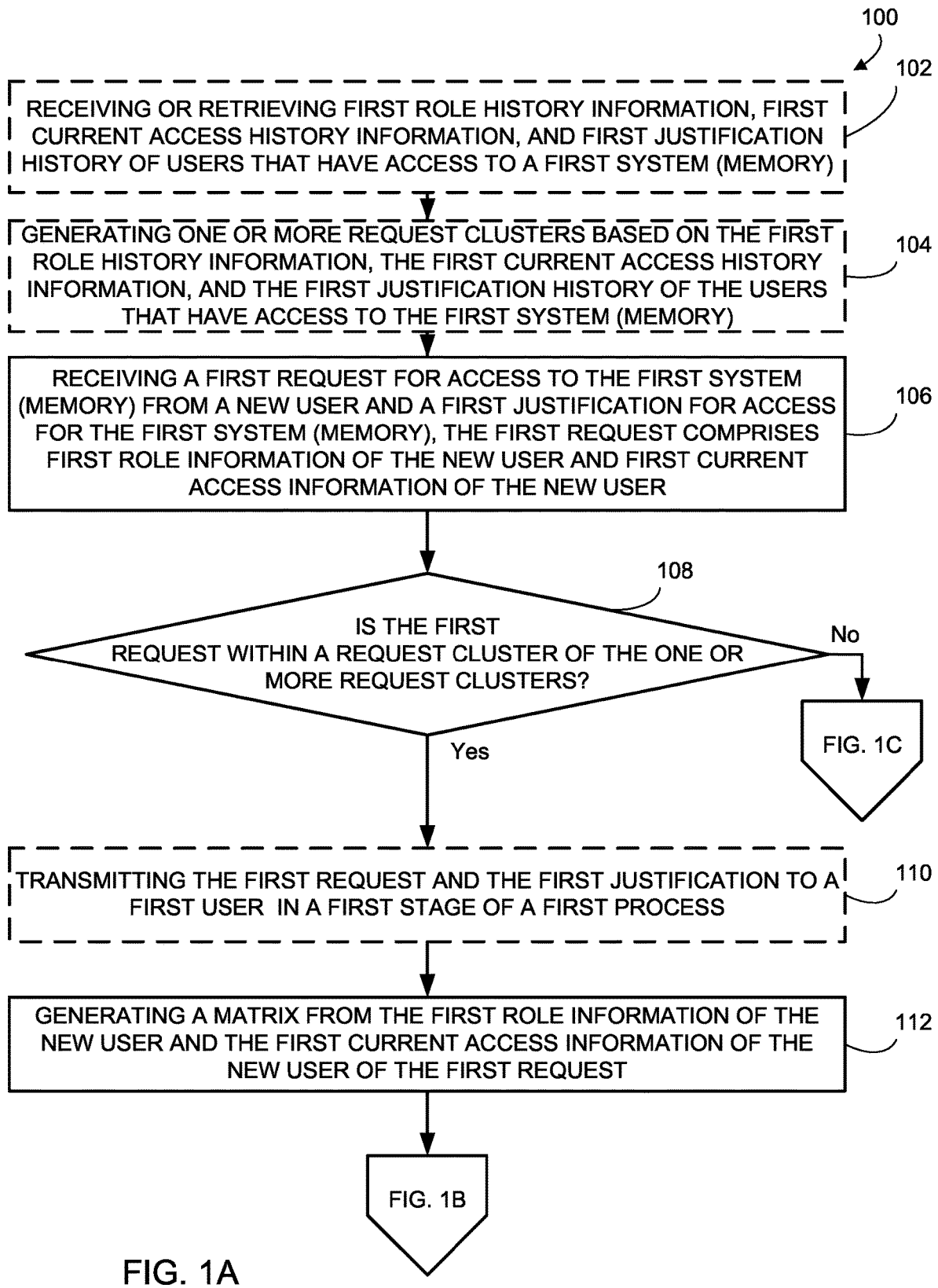
FIGS. 1A, 1B, and 1C are flowcharts of an exemplary method for processing requests for access to a system, memory, or both.
Figure 1B:
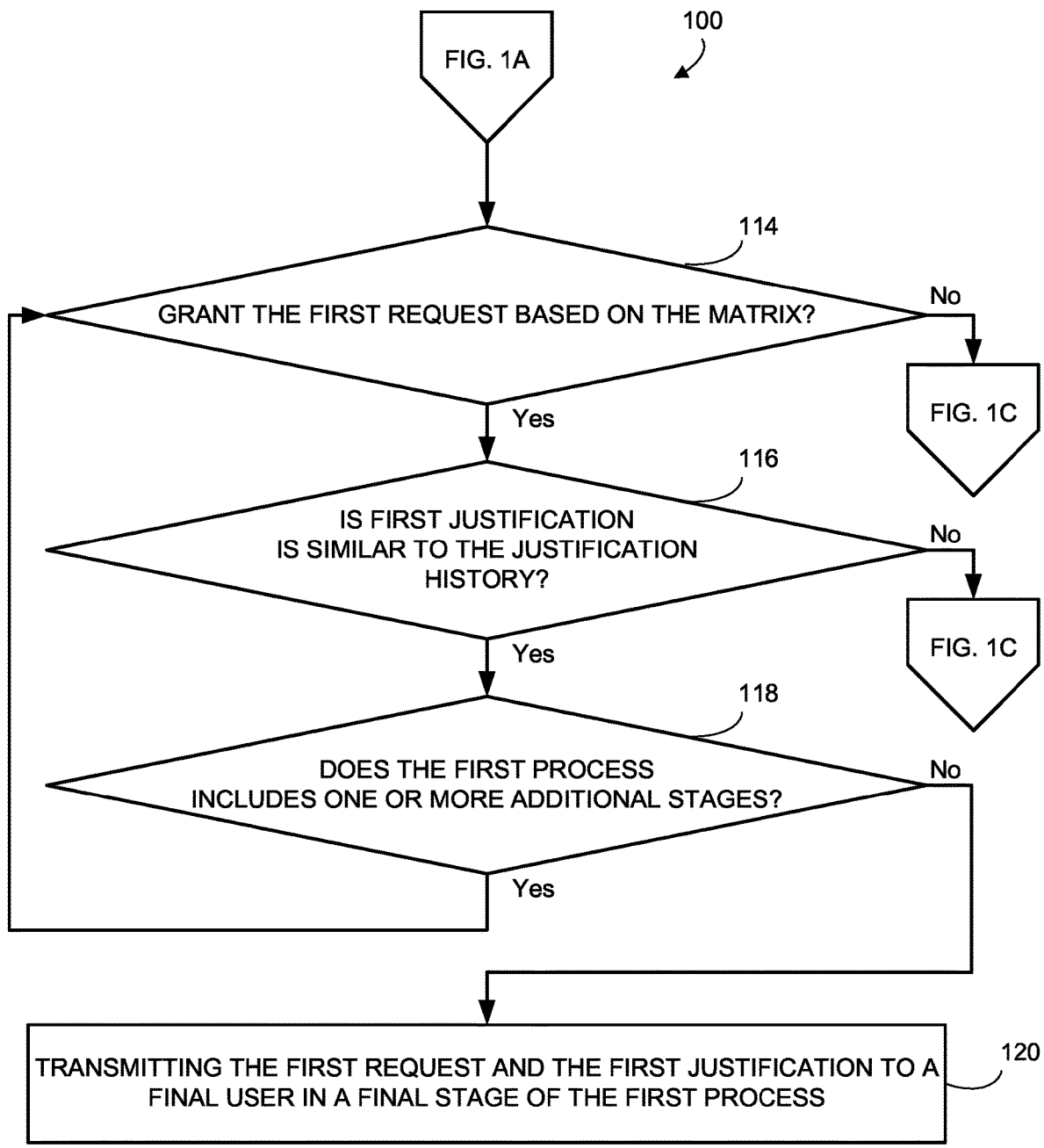
Figure 1C:
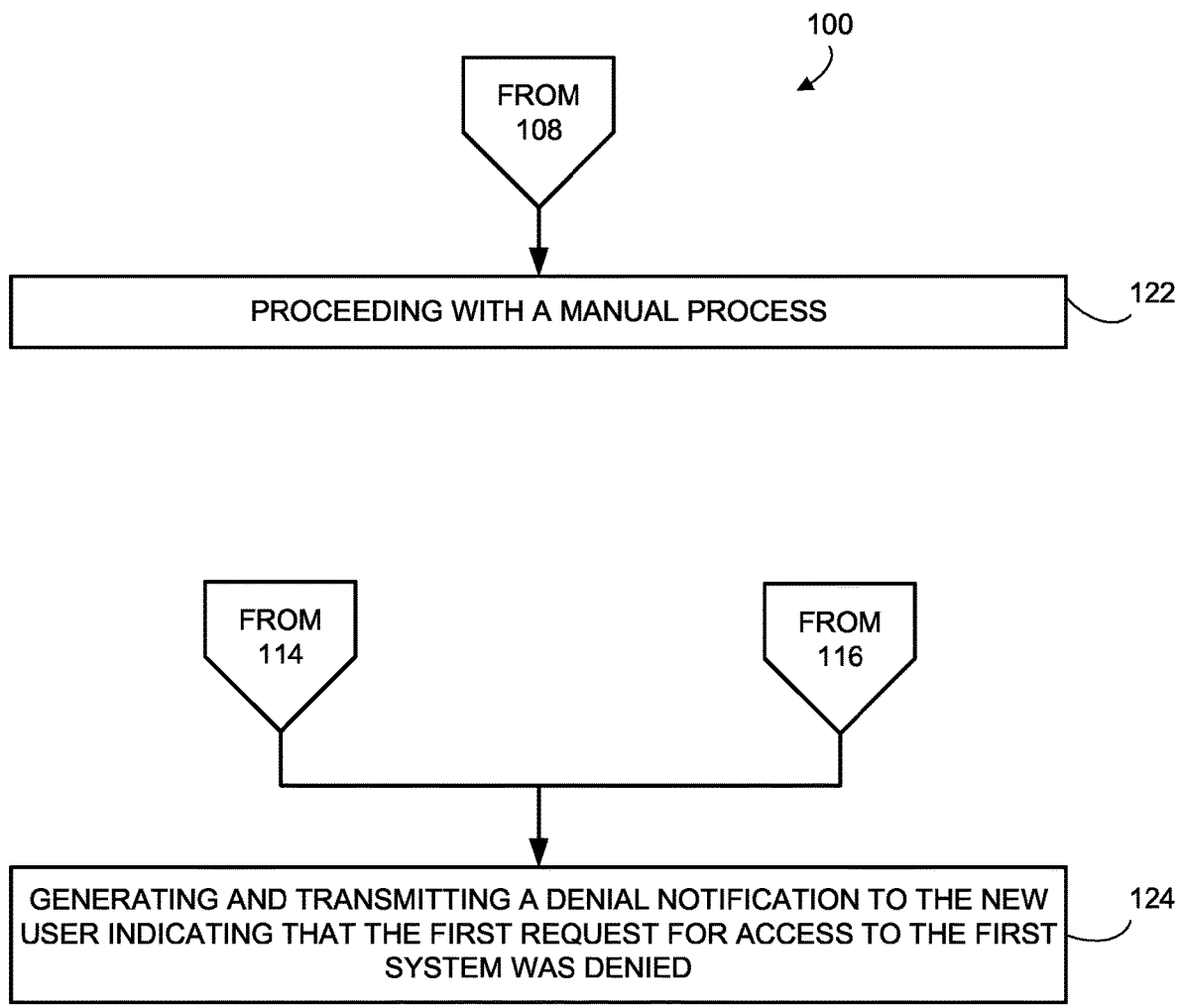

FIGS. 1A, 1B, and 1C are flowcharts of an exemplary method 100 for processing requests for access to a system (e.g., software), memory (e.g., data access), or both. Although method 100 is described as being performed by an access system 408, method 100 may be performed by an access granting system 320 (part of the access system 408) or other devices (e.g., user devices 402A, 402B) within system 400 described in more detail with respect to FIGS. 3 and 4 below.

In block 102, an access system 408 may optionally receive or retrieve first role history information, first current access history information, and first justification history information of users that have access to the first system or first system memory.

In block 104, the access system 408 may optionally generate one or more request clusters based on the first role history information, the first current access history information, and/or the first justification history information of the users that have access to the first system or first system memory. The one or more request clusters are groupings of the data from the first role history information, the first current access history information, and the first justification history information based on similarity of the data. For example, access system 408 may generate a request cluster surrounding common titles (e.g., finance analyst or finance manager) of users that have access to the first system or the first system memory. As another example, the access system 408 may generate a request cluster surrounding common access to a second system among users that have access to the first system or the first system memory. As another optional example, the access system 408 may generate a request cluster surrounding common justifications (e.g., common phrases) that users have used to successfully obtain access to the first system or the first system memory.

In block 106, the access system 408 may receive a first request for access to the first system memory from a new user and a first justification for access for the first system or the first system memory, the first request includes first role information of the new user and first current access information of the new user. The request for access may be a form that is filled out online or via an intranet. Alternatively, the request for access may be in the form of an email or text message. As a second alternative, the justification and/or the request could be verbal (i.e., audio).

In block 108, the access system 408 may determine whether the first request is within a request cluster of the one or more request clusters. For example, the access system 408 may use k-means, density-based spatial clustering of applications with noise (DBSCAN), expectation-maximization (EM), or gaussian mixture modeling (GMM) algorithms to determine whether the first request is within a request cluster. The request clusters would be created via a feature vector, which could be created via an embedding from the justification description and then the metadata (e.g., role, level, etc.). When the first request is within the request cluster of the one or more request clusters, the access system 408 may proceed with block 110 described below. When the first request is not within the request cluster of the one or more request clusters, proceed to block 112 described below.

In block 110, the access system 408 may optionally transmit the first request and the first justification information to a first reviewing user in a first stage of a first process so that the first reviewing user can review the first request and the first justification information.

Although not shown the access system 408 may optionally receive an indication of grant or approval from the first user via a user device (e.g., user device 402A) in which case the process continues in block 112. Alternatively, the access system 408 may optionally receive a denial of access from the first user via a user device (e.g., user device 402A) in which case the access system 408 may generate and transmit a denial notification to the new user indicating that the first request for access to the first system or first system memory was denied.

In block 112, the access system 408 may generate a matrix from the first role information of the new user and the first current access information of the new user of the first request in response to receiving the indication of grant or approval form the first user. The matrix is generally known as a feature matrix. By creating a feature matrix our of the first role information and the first current access information, the system generates data that enables algorithms for distance comparison and information encoding. Basically, neural networks typically process numerical values. Thus, generating a matrix from text of the first role information and the first current access information, the neural networks bad better understand the data for comparison purposes.

In block 114, the access system 408 may determine whether to grant (approve) the first request based on the matrix in a second stage of the first process. The access system 408 may use a trained machine learning model such as a neural network (e.g., a convolutional neural network) to make the determination. When the access system 408 grants (approves) the first request, the access system 408 may proceed to block 116 described below. When the access system 408 denies the first request, the access system may proceed to block 124 described below.

In block 116, the access system 408 may determine whether the first justification is similar to the first justification history of the users that have access to the first system or the first system memory in the second stage of the first process. The access system 408 may also use a trained machine learning model such as a neural network, a long short-term memory, or a transformer, or some combination thereof to make the determination. When the access system 408 determines that first justification is similar to the first justification history of the users that have access to the first system or the first system memory (beyond a predetermined threshold), the access system 408 may proceed to block 118 described below. When the access system 408 determines that the first justification is not similar to the first justification history of the users that have access to the first system or the first system memory (beyond a predetermined threshold), the access system 408 may proceed to block 124 described below.

In block 118, the access system 408 may determine whether the first process includes one or more additional stages. When the access system 408 determines that there are one or more additional stages (e.g., additional review steps), the access system 408 will repeat the second stage of the first process (blocks 114, 116, and 118) using the same types of machine learning models (e.g., neural networks) but trained with grant data (e.g., historical role information, historical current access information, and/or historical justifications of users request access) that is different from the grant data used to train the first machine learning model (e.g., first neural network) of block 114 and the second machine learning model (e.g., second neural network of block 116). For example, when method 100 initially comes to block 114, a first machine learning model is used to decide whether to grant or approval the first request based on the matrix, which includes role information and current access information of the requesting user. This first machine learning model may be trained based on historical role information (e.g., titles such as assistant, associate, analyst, senior associate, manager, director, vice president and/or department such as contracts, legal, human resources, finance, accounting) of users requesting access to the first system or first system memory, historical current access information of users requesting access to the first system or first system memory, and data indicating whether or not a second approving user (different from the first approving user in block 110) approved the requests for access. In one example, the first approving user may be a manager (superior to the requesting user) and the second approving user may be a director (a superior to the manager). When method 100 initially comes to block 116, a second machine learning model is used to decide whether to the first justification is similar to the justification history (beyond a predetermined threshold). This second machine learning model is trained with historical justifications of users requesting access to the first system or first system memory and data indicating whether or not the second approving user approved the requests for access.

When block 114 is repeated for the first time in a third stage, the access system 408 may use an third machine learning model that is of the same type as the first machine learning model, but it is trained with data indicating whether or not an third approving user (different from the first and second approving users) approved the requests for access with historical role information of users requesting access to the first system or first system memory and historical current access information of users requesting access to the first system or first system memory. Continuing the example, when block 116 is repeated for the first time in the third stage, the access system 408 may use a fourth machine learning model trained with historical justifications of users requesting access to the first system or first system memory and data indicating whether or not the third approving user approved the request for access. Then the access system 408 determines whether to the process includes any additional stages in block 118. In this manner, blocks 114, 116, and 118 until the access system 408 decides that there are no additional stages at which time the method 100 may proceed to block 120.

In block 120, the access system 408 may transmit the first request and the first justification to a final approving user in a final stage of the first process. The final approving user may review the request for access and grant (approve) or deny the request. In some embodiments, the access system 408 receives the grant or denial from the final approving user and then generates and transmits an indication of grant or denial to the requesting user.

In block 122, the access system 408 may proceed with a manual process where the access system 408 makes no determination on whether to grant (approve) the request for access. Instead, the access system 408 simply facilitates the grant (approval) of the request by transmitting the request and necessary information (e.g., role information, current access information, justification) sequentially to one or more approving users. When the access system 408 receives approval from an approving user, it transmits the request and necessary information to the next approving user until there are no more approving users. Once all the approving users have approved the request, the access system 408 may transmit a message to the requesting user indicating that the user has been approved for access. If the access system 408 receives a denial of access from any of the approving users, the access system 408 stops from sending the request and necessary information to the next approving user and instead transmits a message to the request user informing them of the denial of their request for access.

In block 124, the access system 408 may generate and transmit a denial notification to the new user (requesting user) indicating that the first request for access to the first system or first system memory was denied.

Figure 2A:
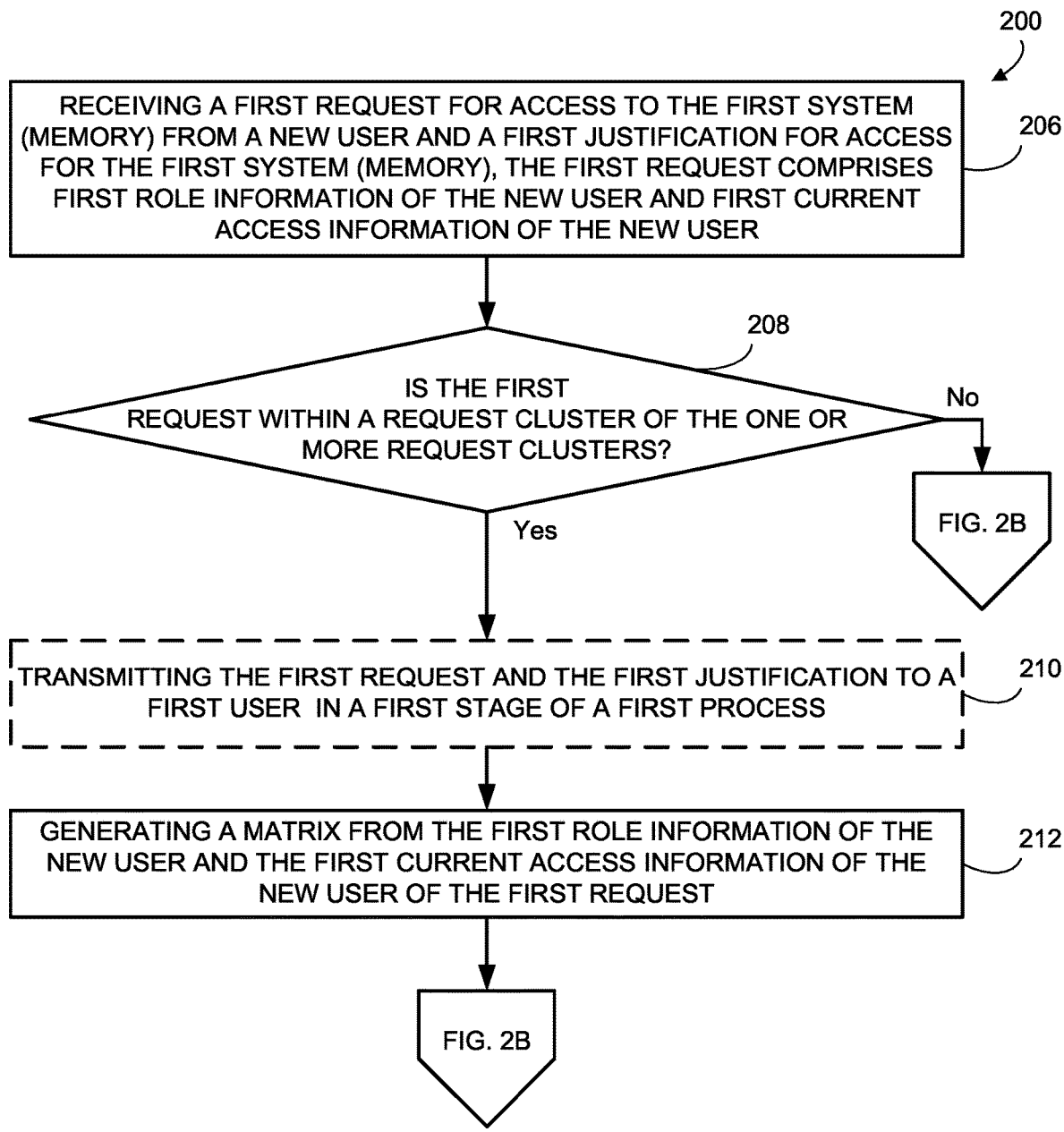
FIGS. 2A and 2B are flowcharts of another exemplary method for processing access requests.
Figure 2B:
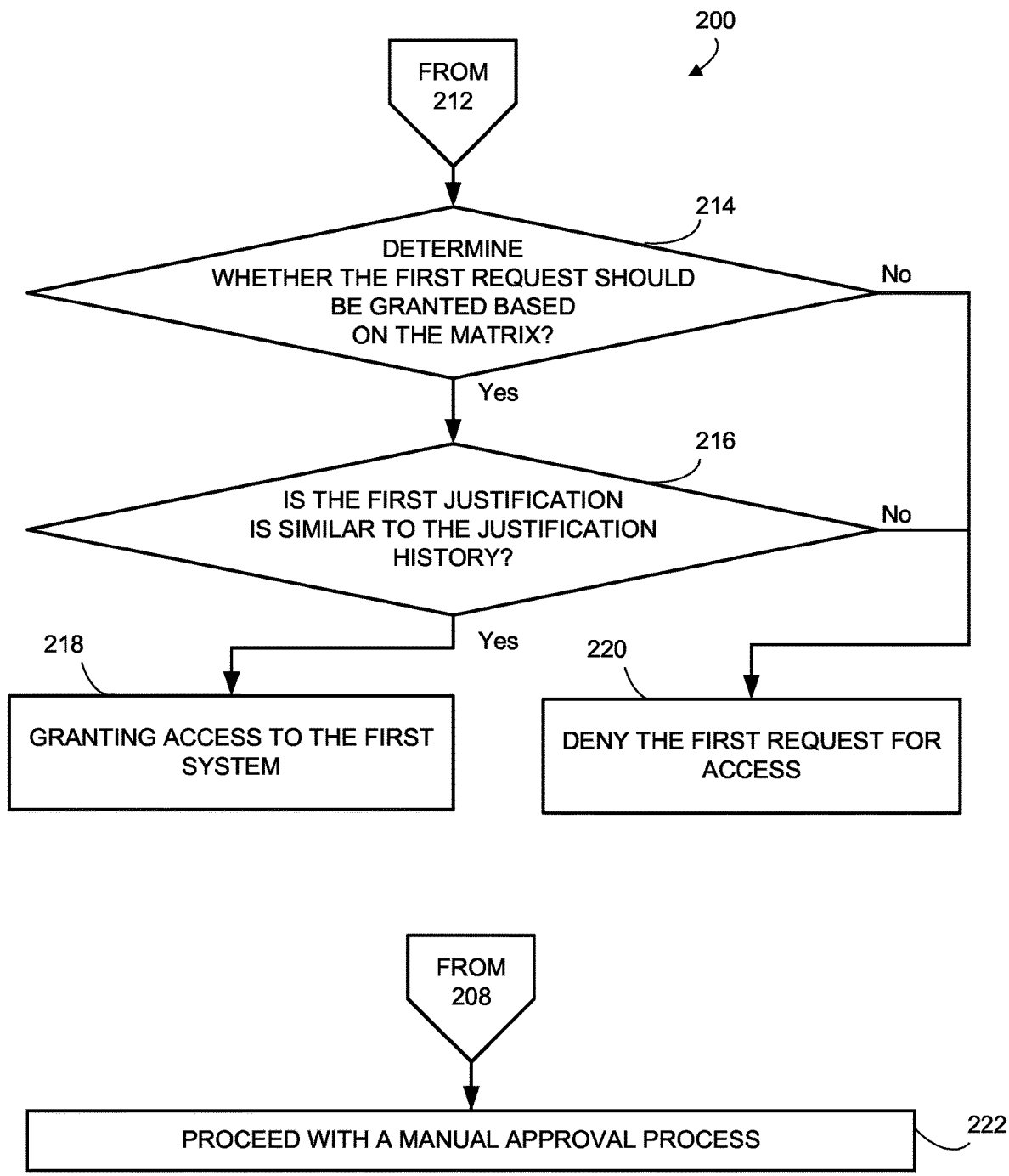

FIG. 2 is a flowchart of another exemplary method 200 for processing requests for access to a system (e.g., software), memory (e.g., data access), or both. Although method 200 is described as being performed by an access system 408, method 200 may be performed by an access granting system 320 (part of the access system 408) or other devices (e.g., user devices 402A, 402B) within system 400 described in more detail with respect to FIGS. 3 and 4 below.

Method 200 is similar to method 100 except that method 200 does not check for additional stages, does not repeat steps, and omits blocks equivalent to blocks 102, 104, and 120. The descriptions associated with blocks 106, 108, 110, 112, 114, 116, and 122 of method 100 are referenced and incorporated as the respective descriptions for blocks 206, 208, 210, 212, 214, 216, and 222. Thus, the descriptions for blocks 206, 208, 210, 212, 214, 216, and 222 will be omitted below for brevity.

In block 218, the access system 408 may grant the access to the first system and/or first system memory to the new (requesting) user access when the access system 408 determines that the first justification of the new user is similar (beyond a predetermined threshold) to the justification history of users requesting access to the same first system and/or first system memory. Put another way, the access system 408 may grant the first request for access to the first system and/or first system memory. This may include adding the new user to a list of users that can access the first system (e.g., software) and/or first system memory (e.g., a database or other data), notifying (e.g., via an email, push notification, text message) the new user that he has been approved for access, or both.

In block 220, the access system 408 may deny the first request for access to the first system and/or first system memory by the new (requesting) user when the access system 408 determines that the first justification of the new user is not similar (beyond a predetermined threshold) to the justification history of users requesting access to the same first system and/or first system memory (block 216) or when the access system 408 determines that first request should not be granted based on the matrix (block 214). This may include adding the new user to a list of unauthorized users for the first system and/or the first system memory, notifying (e.g., via an email, push notification, text message) the new user that he has been denied access, or both.

Figure 3:
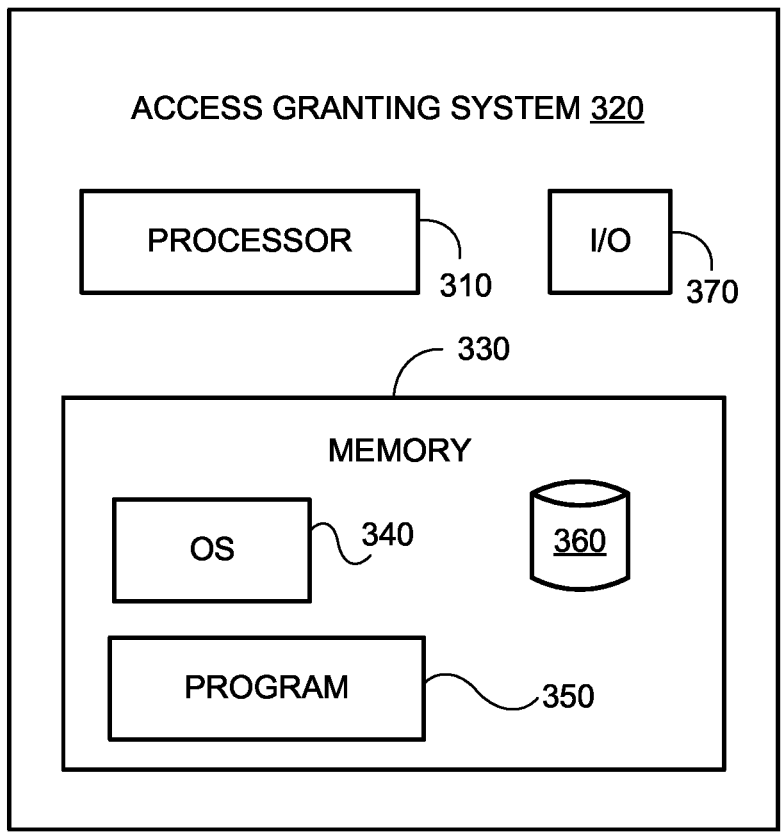
FIG. 3 is a component diagram of an example access granting system.

FIG. 3 is a component diagram of an access granting system 320.

As shown, access granting system 320 may include a processor 310, an input/output ("I/O") device 370, a memory 330 containing an operating system ("OS") 340, a program 350 and database 360. For example, access granting system 320 may be a single device (e.g., server) or may be configured as a distributed computer system including multiple servers, devices, or computers that interoperate to perform one or more of the processes and functionalities associated with the disclosed embodiments. In some embodiments, access granting system 320 may further include a peripheral interface, a transceiver, a mobile network interface in communication with the processor 310, a bus configured to facilitate communication between the various components of video conference system 320, and a power source configured to power one or more components of video conference system 320.

A peripheral interface (not shown) may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver (not shown) may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface (not shown) may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 310 may include one or more of a microprocessor, microcontroller, digital signal processor, co-processor or the like or combinations thereof capable of executing stored instructions and operating upon stored data. Memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 330.

Processor 310 may be one or more known processing devices, such as a microprocessor from the Pentium™ family manufactured by Intel™ or the Turion™ family manufactured by AMD™. Processor 310 may constitute a single core or multiple core processor that executes parallel processes simultaneously. For example, processor 310 may be a single core processor that is configured with virtual processing technologies. In certain embodiments, processor 310 may use logical processors to simultaneously execute and control multiple processes. Processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Access granting system 320 may include one or more storage devices configured to store information used by processor 310 (or other components) to perform certain functions related to the disclosed embodiments. In some embodiments, access granting system 320 may include memory 330 that includes instructions to enable processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, access granting system 320 may include memory 330 that includes instructions that, when executed by processor 310, perform one or more processes consistent with the functionalities disclosed herein. Methods, systems, and articles of manufacture consistent with disclosed embodiments are not limited to separate programs or computers configured to perform dedicated tasks. For example, access granting system 320 may include memory 330 that may include one or more programs 350 to perform one or more functions of the disclosed embodiments. Moreover, processor 310 may execute one or more programs 350 located remotely from access system 408 (see FIG. 4). For example, access system 408 may access one or more remote programs 350, that, when executed, perform functions related to disclosed embodiments.

Memory 330 may include one or more memory devices that store data and instructions used to perform one or more features of the disclosed embodiments. Memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 630 may include software components that, when executed by processor 310, perform one or more processes consistent with the disclosed embodiments. In some embodiments, memory 330 may include a database 360 for storing related data to enable authentication system 320 to perform one or more of the processes and functionalities associated with the disclosed embodiments.

Access granting system 320 may also be communicatively connected to one or more memory devices (e.g., databases) locally or through a network. The remote memory devices may be configured to store information and may be accessed and/or managed by access granting system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Access granting system 320 may also include one or more I/O devices 370 that may comprise one or more interfaces for receiving signals or input from devices and providing signals or output to one or more devices that allow data to be received and/or transmitted by access granting system 320. For example, access granting system 320 may include interface components, which may provide interfaces to one or more input devices, such as one or more keyboards, mouse devices, touch screens, track pads, trackballs, scroll wheels, digital cameras, microphones, sensors, and the like, that enable access granting system 320 to receive data from one or more users.

In exemplary embodiments of the disclosed technology, access granting system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 4:
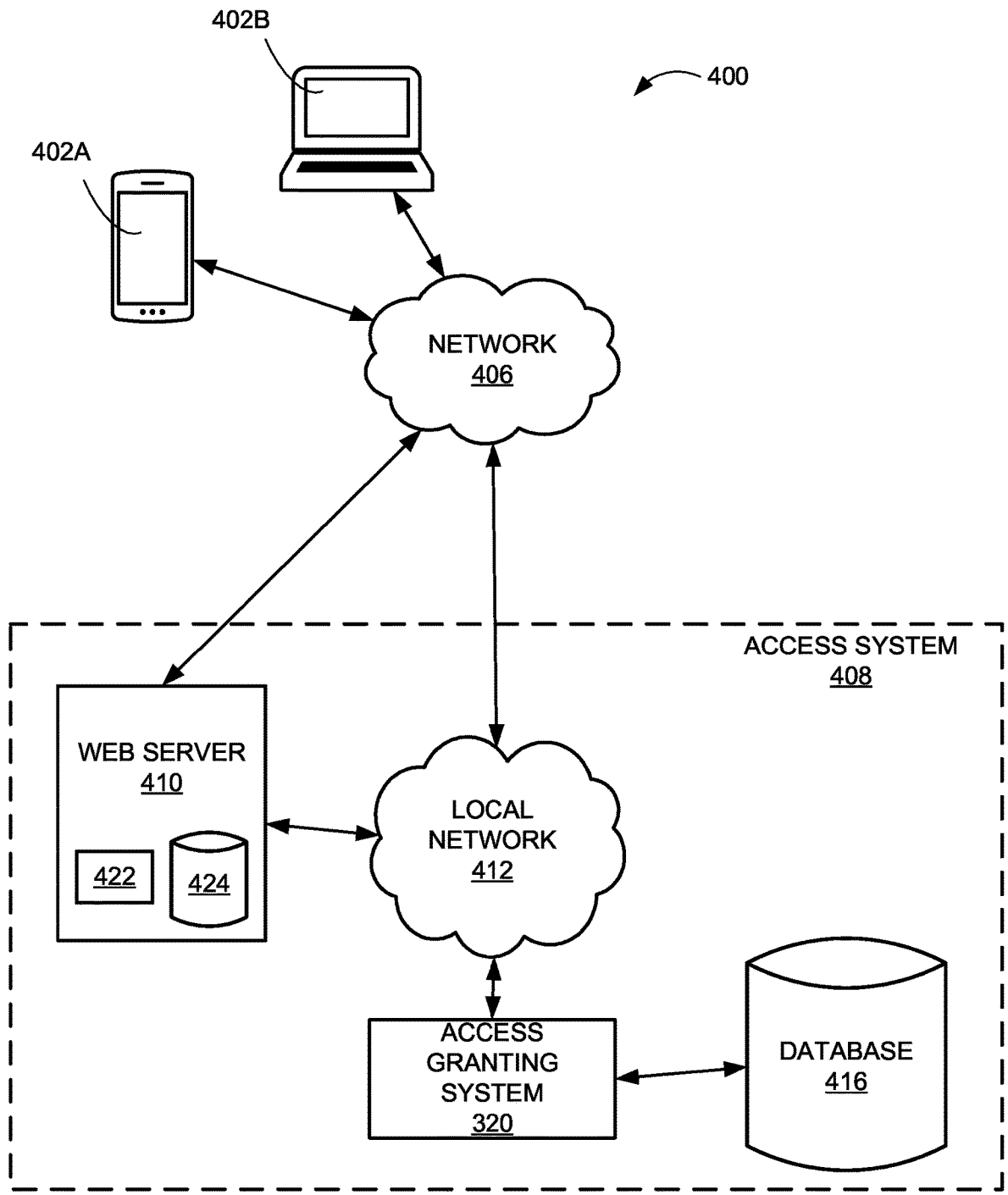
FIG. 4 is a diagram of an exemplary system for processing access requests.

FIG. 4 is a diagram of an exemplary system 400 for processing requests for access to a system (e.g., software), memory (e.g., data access), or both. The components and arrangements shown in FIG. 4 are not intended to limit the disclosed embodiments as the components used to implement the disclosed processes and features may vary. As system 400 may include a first user device 402A (e.g., associated with a new requesting user), a second user device 402B (e.g., associated with an approving user), and an access system 408 configured to communicate over a network 406. The access system 408, or one or more components therein, may be configured to interact with the first user device 402A. As shown, the access system 408 may include, for example, a web server 410, a local network 412, an access granting system 420, and a database 416. Web server 410, first user device 402A, and/or second user device 402B may have a similar structure as shown and described with respect to FIG. 3 and may include many components that are similar to or even have the same capabilities as those described with respect to access granting system 320.

In some embodiments, a first person may operate a first user device 402A and a second person may operate a second user device 402B. Although user device 402A is shown to be a smart phone and user device 402B is shown as a laptop computer, the first user device 402A, the second user device 402B, and any additional (not shown) user devices, can each include one or more of a mobile device, smart phone, general purpose computer, tablet computer, laptop computer, telephone, PSTN landline, smart wearable device, other mobile computing device, or any other device capable of communicating with other devices (e.g., including those of access system 408) via the local network 412, network 406, or both. In some embodiments, the first user device 402A and/or the second user device 402B may include or incorporate electronic communication devices for hearing or vision impaired users. The first user device 402A or the second user device 402B may belong to or be provided by a user, or may be borrowed, rented, or shared. According to some embodiments, the first user device 402A and/or the second user device 402B may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Local network 412 may comprise any type of computer networking arrangement used to exchange data in a localized area, such as WiFi, Bluetooth™, Ethernet, and other suitable network connections that enable user devices (e.g., first user device 402A and/or second user device 402B) to interact with one another and to connect to network 406 for interacting with components in system environment 400. In some embodiments, local network 412 may comprise an interface for communicating with or linking to network 406. In some embodiments, local network 412 may include a home network, such as a LAN or WLAN set up in a user's house. In some embodiments, local network 412 may be commonly used network of a local business, such as, for example, a Wi-Fi network at a particular coffee shop.

Network 406 may be of any suitable type, including individual connections via the internet such as cellular or WiFi networks. In some embodiments, network 406 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 406 may comprise any type of computer networking arrangement used to exchange data. For example, network 406 may be the Internet, a private data network, virtual private network using a public network, and/or other suitable connection(s) that enables components in system environment 400 to send and receive information between the components of system 400. Network 406 may also include a public switched telephone network ("PSTN") and/or a wireless network.

Access system 408 may be associated with an entity such as a business, corporation, individual, partnership, or any other group that provides one or more of goods, services, and consultations to individuals who are or potentially are consumers of those goods, services, and consultations.

Access system 408 may include one or more servers, devices, and computer systems for performing one or more functions associated with products and/or services that the entity associated with the access system 408 provides. Such servers, devices, and computer systems may include, for example, web server 410 and access granting system 320, as well as any other computer systems necessary to accomplish tasks associated with access system 408.

Web server 410 may include a computer system configured to generate and provide one or more websites accessible to customers and user, as well as any other individuals involved in access system 408's normal operations. Web server 410 may include a computer system configured to receive communications from the first user device 402A and/or the second user device 402B via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems (e.g., access granting system 320) of system 400. In some embodiments, web server 410 may host websites or applications that may be accessed by the first user device 402A and/or the second user device 402B. According to some embodiments, web server 410 may include software tools, similar to those described with respect to first user device 402A and/or second user device 402B above, that may allow web server 410 to obtain network identification data from the first user device 402A or the second user device 402B.

Local networks 412 may comprise any type of computer networking arrangement used to exchange data in a localized area, such as WiFi, Bluetooth™, Ethernet, and other suitable network connections that enable components of access system 408 to interact with one another and to connect to network 406 for interacting with components in system environment 400. In some embodiments, local network 412 may comprise an interface for communicating with or linking to network 406. In other embodiments, components of access system 408 may communicate via network 406, without a separate local network 412.

Database 416 may be a database associated with access system 408 and may store a variety of information relating to users (e.g., titles, department associations, access to other systems or data), transactions, user credentials (e.g., usernames and passwords), customer networks and devices, and business operations. Database 416 may also serve as a back-up storage device and may contain data and information that is also stored on, for example, local databases associated with web server 410, access granting system 320. Database 416 may be accessed by other devices or systems (e.g., access granting system 320) and may be used to store records of every interaction, communication, and/or transaction a particular user has had with access system 408.

While web server 410, first user device 402A, second user device 402B, and access granting system 320 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 410, first user device 402A, second user device 402B, and access granting system 320 may include a greater or lesser number of components than those illustrated.

Although the preceding description describes various functions of the first user device 402A, the second user device 402B, web server 410, database 416, and access granting system 320, in some embodiments, some or all of these functions may be carried out by a single computing device.

Exemplary Use Cases

The following exemplary use cases describe examples of a typical flow pattern. They are intended solely for explanatory purposes and not in limitation.

In one exemplary use case, a new user, John may want access to software that is necessary for or helps him better perform his job. John submits, via user device 402A and to the access granting system 320, a request for access to the software along with a justification for why he should have access for the software (e.g., it is required for him to complete financial analyst reports).

Meanwhile, previously, or afterwards, an access granting system 320 may retrieve first role history information (e.g., a list of positions or titles of users that have been granted access to the software), first current access history information (e.g., a list of software or data that previous users that have been granted access to the software), and first justification history information (e.g., previous justifications for gaining access) of users that have access to the software. The access granting system 320 may generate one or more clusters based on the first role history information, the first current access history information, and the first justification history information of the users that have access to the software.

The access granting system 320 may receive John's request for access to the software which may include or be received with the justification for accessing the software. Additionally, the request for access may include information associated with John's role at a company (e.g., position title) and information regarding what John currently has access to at the company.

The access granting system 320 then compares the information in John's request and the justification he used with the one or more clusters. Based on the comparison, the access granting system 320 determines whether the information in the first request is within the one or more request clusters.

When the access granting system 320 determines that the information in first request is within the one or more request clusters, the access granting system 320 transmits the first request and the first justification to a first reviewing user (via user device 402B) to review. The first reviewing user may be John's supervisor. Regardless, the first reviewing user transmits a message back to the access granting system 320 that indicates whether the first reviewing user approves or denies the request for access to the software. In response to receiving an indication of approval from the first reviewing user, the access granting system 320 may preprocess the first role information of John and the first current access information of John of the request. For example, the access granting system 320 may generate a matrix from the first role information and the first current access information. Regardless, the access granting system 320 may determine, using a first machine learning model (e.g., a convolutional neural network), whether to approve the request based on the pre-processed first role information and the first current access information.

When the access granting system 320 approves the request via the first machine learning model, the access granting system 320 determines, using a second machine learning model (e.g., long short-term memory (LSTM) or a transformer) whether John's justification submitted with his request is similar to the first justification history information of users that have access to the software. When the access granting system 320 approves the justification via the second machine learning model, the access granting system 320 determines whether there are additional stages of automatic review. If there are no more stages of automatic review, then the access granting system 320 may send the first request and the first justification to a final reviewing user. If the final reviewing user approves and sends an approval notification or message to the access granting system 320, the access granting system 320 will generate a message indicating John's request has been approved and transmit the request. Additionally, the access granting system 320 may add John's name to an approved user list in a relevant database (e.g., database 416).

The features and other aspects and principles of the disclosed embodiments may be implemented in various embodiments and environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method to access first system memory, comprising:
    retrieving, by one or more processors, first role history information, first current access history information, and first justification history information of users that have access to the first system memory;
    generating, by the one or more processors, one or more request clusters based on the first role history information and the first current access history information of the users that have access to the first system memory;
    receiving, by the one or more processors, a first request for access to the first system memory from a new user and a first justification for access for the first system memory, the first request comprises first role information of the new user and first current access information of the new user;
    determining, by the one or more processors using k-means, density based spatial clustering of applications with noise (DBSCAN), expectation-maximization (EM), gaussian mixture modeling (GMM) algorithms, or combinations thereof, whether the first request is within a request cluster of the one or more request clusters;
    when the first request is within the request cluster of the one or more request clusters:
        transmitting, by the one or more processors, the first request and the first justification to a first user in a first stage of a first process;

in response to receiving an indication of grant from the first user:
  generating, by the one or more processors, a matrix from the first role information of the new user and the first current access information of the new user of the first request;
  determining, using a first neural network, whether to grant the first request based on the matrix in a second stage of the first process;
  when the first request is granted by the first neural network, determining, using a second neural network and the one or more processors, whether the first justification is similar to the first justification history information of the users that have access to the first system memory beyond a similarity threshold in the second stage of the first process;
  when the first justification is similar to the first justification history information of the users that have access to the first system memory beyond the similarity threshold, determining whether the first process comprises one or more additional stages;
  when the first process does not comprise the one or more additional stages, transmitting, using the one or more processors, the first request and the first justification to a final user in a final stage of the first process; and
  in response to receiving a final indication of grant from the final user, generating and transmitting, using the one or more processors, a grant notification to the new user indicating that the first request for access to the first system memory is granted.

2. The method of claim 1, further comprising:
when the first request is not within the request cluster of the one or more request clusters, proceeding with a manual process.

3. The method of claim 2, further comprising:
in response to receiving a denial of access from the first user, generating and transmitting, using the one or more processors, a denial notification to the new user indicating that the first request for access to the first system memory was denied.

4. The method of claim 3, further comprising:
when the first request is denied by the first neural network, generating and transmitting, using the one or more processors, the denial notification to the new user indicating that the first request for access to the first system memory was denied.

5. The method of claim 4, further comprising:
when the first justification is not similar to the first justification history information of the users that have access to the first system memory beyond the similarity threshold, generating and transmitting, using the one or more processors, the denial notification to the new user indicating that the first request for access to the first system memory was denied.

6. The method of claim 5, wherein the first justification comprises a first phrase and the first justification history information comprises a plurality of second phrases.

7. The method of claim 6, further comprising:
repeating automatically the second stage of the first process using the first neural network and grant data associated with a different user from previous users until the first process does not comprise the one or more additional stages.

8. The method of claim 7, further comprising:
generating, using the one or more processors, a username and a temporary password for the new user and transmit, using the one or more processors, the username and the temporary password to the new user.

9. The method of claim 8, wherein the first neural network is a convolutional neural network.

10. The method of claim 8, wherein the second neural network comprises long short-term memory (LSTM) or a transformer.

11. A method to access first system memory, comprising:
receiving, by one or more processors in communication with a memory, a first request for access to the first system memory from a new user and a first justification for access for the first system memory, the first request comprises first role information of the new user and first current access information of the new user;
determining, by the one or more processors using k-means, density-based spatial clustering of applications with noise (DBSCAN), expectation-maximization (EM), gaussian mixture modeling (GMM) algorithms, or combinations thereof, whether the first request is within a request cluster of one or more request clusters based on first role history information and first current access history information of users that have access to the first system memory;
when the first request is within the request cluster of the one or more request clusters:
  transmitting, using the one or more processors, the first request and the first justification to a first user in a first stage of a first process;
  in response to receiving an indication of grant from the first user:
    generating, using the one or more processors, a matrix from the first role information of the new user and the first current access information of the new user of the first request;
    determining, using a first neural network and the one or more processors, whether to grant the first request based on the matrix in a second stage of the first process;
    when the first request is granted by the first neural network, determining, using a second neural network and the one or more processors, whether the first justification is similar to first justification history information of the users that have access to the first system memory beyond a similarity threshold in the second stage of the first process;
    when the first justification is similar to the first justification history information of the users that have access to the first system memory beyond the similarity threshold, determining, using the one or more processors, whether the first process comprises one or more additional stages in the second stage of the first process;
    when the first process does not comprise the one or more additional stages, transmitting, using the one or more processors, the first request and the first justification to a final user in a final stage of the first process; and
    in response to receiving a final indication of grant from the final user, generating and transmitting, using the one or more processors, a grant notification to the new user indicating that the first request for access to the first system memory is granted.

12. The method of claim 11, further comprising:
when the first request is not within the request cluster of the one or more request clusters, proceed with a manual process; and
in response to receiving a denial of access from the first user, generating and transmitting, using the one or more processors, a denial notification to the new user indicating that the first request for access to the first system memory was denied; and
when the first request is denied by the first neural network, generating and transmitting, using the one or more processors, the denial notification to the new user indicating that the first request for access to the first system memory was denied; and
when the first justification is not similar to the first justification history information of the users that have access to the first system memory beyond the similarity threshold, transmitting, using the one or more processors, the denial notification to the new user indicating that the first request for access to the first system memory was denied.

13. The method of claim 12, further comprising:
when the first process comprises the one or more additional stages, repeating automatically the second stage of the first process using the first neural network and grant data associated with a different user from previous users until the first process does not comprise the one or more additional stages.

14. The method of claim 13, further comprising:
generating, using the one or more processors, a username and a temporary password for the new user and transmitting, using the one or more processors, the username and the temporary password to the new user.

15. A method to access first system memory, comprising:
receiving, using one or more processors, a first request for access to the first system memory from a new user and a first justification for access for the first system memory, the first request comprises first role information of the new user and first current access information of the new user;
determining, via the one or more processors using k-means, density-based spatial clustering of applications with noise (DBSCAN), expectation-maximization (EM), gaussian mixture modeling (GMM) algorithms, or combinations thereof, whether the first request is within a request cluster of one or more request clusters based on first role history information and current access history information of users that have access to the first system memory;
when the first request is within the request cluster of the one or more request clusters:
generating a matrix from the first role information of the new user and the first current access information of the new user of the first request;
determining, using a first neural network and the one or more processors, whether to grant the first request based on the matrix;
when the first request is granted by the first neural network, determining, using a second neural network and the one or more processors, whether the first justification is similar to first justification history information of the users that have access to the first system memory beyond a similarity threshold; and
when the first justification is similar to the first justification history information of the users that have access to the first system memory beyond the similarity threshold, granting the new user access to the first system memory.

16. The method of claim 15, further comprising:
when the first justification is similar to the first justification history information of the users that have access to the first system memory, generating and transmitting, using the one or more processors, a grant notification to the new user indicating that the first request for access to the first system memory is granted.

17. The method of claim 16, wherein the first neural network is a convolutional neural network.

18. The method of claim 17, wherein the second neural network comprises long short-term memory (LSTM) or a transformer.

* * * * *